July 22, 1958     F. H. WRIGHT ET AL     2,844,794
TESTING DEVICE
Filed Dec. 27, 1955
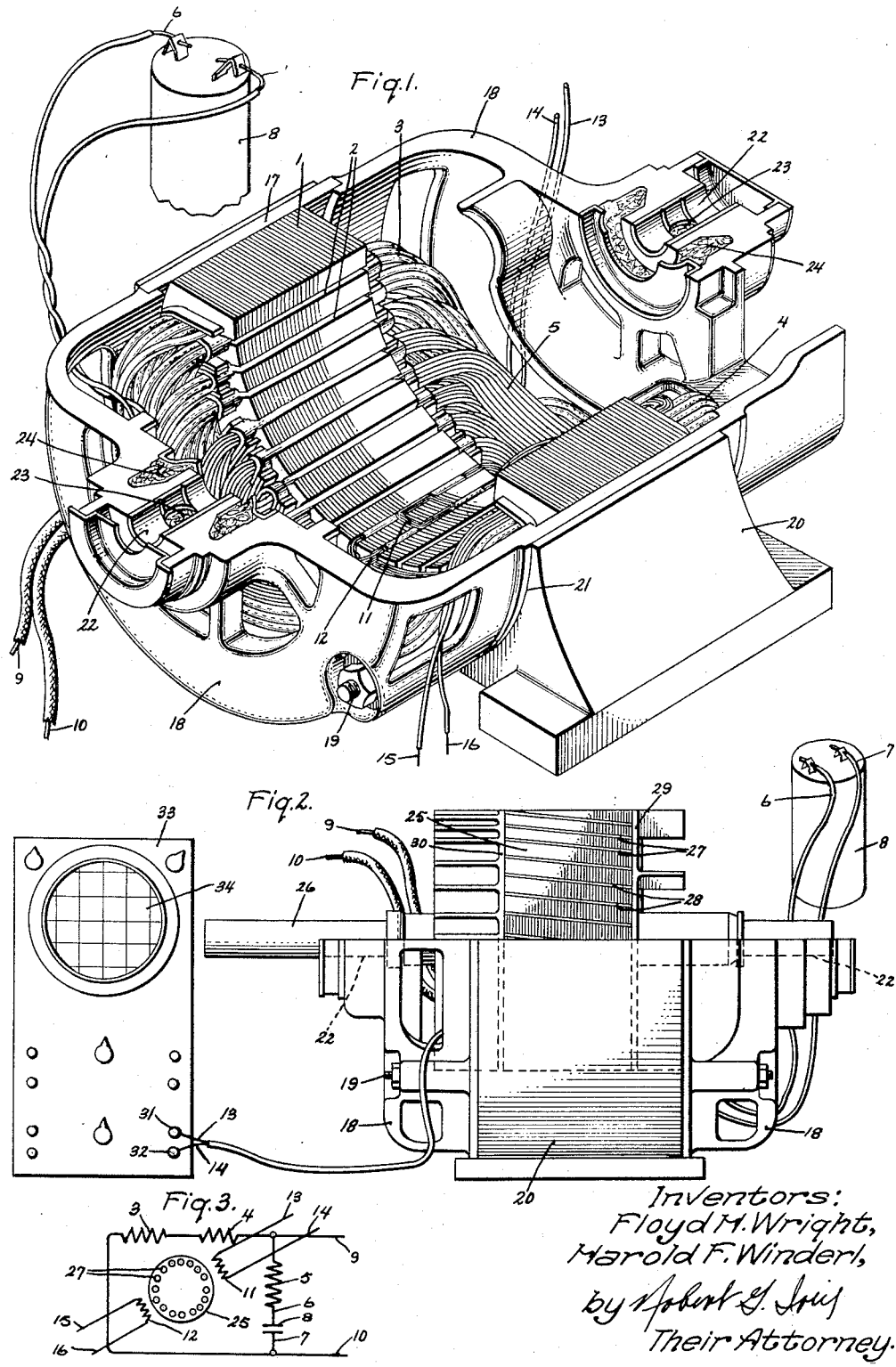
Inventors:
Floyd H. Wright,
Harold F. Winderl,
by Robert G. Iris
Their Attorney.

United States Patent Office 2,844,794
Patented July 22, 1958

2,844,794
TESTING DEVICE

Floyd H. Wright, Fort Wayne, Ind., and Harold F. Winderl, Syracuse, N. Y., assignors to General Electric Company, a corporation of New York Application December 27, 1955, Serial No. 555,400

6 Claims. (Cl. 324—158)

This invention relates to dynamoelectric machines, and more particularly to a device designed to facilitate and expedite the testing of the rotors of induction-type machines.

In the mass production of dynamoelectric machines, and more particularly induction-type alternating current electric motors, it is highly important that the rotor member measure up to certain minimum standards of performance. It is, however, equally important that the process of ensuring that each rotor measure up to this minimum standard should not delay production. Thus, it is desirable to provide means for testing induction motor rotors effectively and swiftly.

It is, therefore, an object of this invention to provide a rotor testing device which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In the drawing, Figure 1 is a view in perspective of the improved testing device of this invention;

Figure 2 is a side view of the improved testing device of this invention in use; and Figure 3 is a schematic diagram of the electrical circuit of the windings of the improved testing device of the invention.

Referring now to Figures 1 and 3 of the drawing, there is shown a test motor member which includes a core member 1, formed of a stacked plurality of thin laminations of magnetic material, having a span of approximately 180 degrees, as shown. Core member 1 has a plurality of slots 2 formed therein; a main winding having a pair of poles 3 and 4 and an auxiliary winding 5 are arranged in the slots. The auxiliary winding 5 is physically displaced from the main winding poles 3 and 4 and is in series, through leads 6 and 7, with a phase displacing device such as capacitor 8. Main winding poles 3 and 4 and the auxiliary winding 5 are arranged to be connected across a source of alternating current power (not shown) by means of leads 9 and 10. As appears best in Figure 3, the circuit is a relatively standard one of the capacitor run type where the main winding poles 3 and 4 and the auxiliary winding 5 are in parallel, with capacitor 8 in series with the auxiliary winding and with the main winding poles 3 and 4 and the auxiliary winding 5 connected across leads 9 and 10. In addition, windings such as 11 and 12 may be provided for sensing various conditions of the rotor to be tested. Winding 11 will normally be provided with leads 13 and 14 and winding 12 will have leads 15 and 16 so that the sensing windings may be connected to suitable instruments which will provide the information desired in the proper form. The design of the sensing windings and of the instruments connected therewith is, of course, not a part of this invention and the particular construction shown in Figure 1 is not to be taken as limiting in any manner.

Stator core 1 is secured within a semicylindrical housing member 17 by any desired means such as, for instance, welding. An end shield member 18 is secured at each end of the housing member 17 and is secured thereto by any desired means such as, for instance, through bolts 19. The two end shields 18 preferably have the same 180 degree span as the housing member 17 and the core 1 for ease of manufacture and appearance. The motor member 1 may be supported in any desired manner, such as, for instance, by support member 20 which has an arcuate recess 21 in which the housing member 17 is secured. A bearing 22 is provided in each end shield 18 concentrically with core member 1. The bearing is preferably semicylindrical as shown so as to receive the shaft of a rotor to be tested and provide positive support therefor while presenting no obstacle to rapid insertion of the shaft into the bearing and removal therefrom. Each bearing is preferably provided with adequate lubricating means such as a wick 23 of absorbent material impregnated with lubricant. An adequate supply of lubricant may be maintained for the wick within mass 24 of absorbent material.

Referring now to Figure 2, an induction-type rotor member 25 to be tested has a shaft 26 extending from each end thereof concentrically therewith. The rotor member is generally of the type which is made up of a plurality of thin laminations of magnetic material with slots 27 formed therein and conductors 28 arranged within the slots and short circuited together at each end, as shown by short circuiting rings 29 and 30. Rotor member 25 is placed within the bore of core 1 so that shaft 26 is rotatably supported at each end by a bearing 22.

Each of the sensing coils 11 and 12 on core member 1 may be connected to an appropriate instrument; as shown in Figure 2, for instance, sensing coil 11 may be connected through its external conductors 13 and 14 to the terminals 31 and 32 respectively of an oscilloscope 33 so that the values sensed by the coil 11 may be seen by an observer on face 34 of the oscilloscope. One such value which may be so read is, for instance, the degree of eccentricity of the rotor or lack of roundness thereof. However, the invention is in no way limited to the determination of a single particular characteristic but lies in the provision of means for easily determining several characteristics in a short space of time.

Once shaft 26 has been laid in bearings 22 with rotor 25 appropriately located in the bore of core 1, alternating current power is supplied to the main winding poles 3 and 4 and the auxiliary winding 5 through leads 9 and 10. With poles 3 and 4 of the main winding suitably displaced from the single pole of winding 5, a rotating field will be set up to exert torque on the rotor 25 and cause it to commence rotating. The presence of only half a stator core creates a considerable amount of torque pulling shaft 26 down into the bearings 22, so that a considerable amount of friction is present and must be overcome to bring rotor 25 up to speed quickly. It is for this reason that it has been found desirable to provide phase displacing means in series with the auxiliary winding, in the manner that capacitor 8 has been placed in series with winding 5. Since it is desirable that the rotor move at a relatively high speed for testing purposes, and since this speed is dependent upon the number of poles wound on the stator, it is preferable that this number be kept to a minimum. Thus, in the illustrated embodiment of the invention, the main winding has only two poles while the auxiliary winding has but a single wound pole which will form consequent poles as needed. However, it will be recognized that greater numbers of poles may be wound both with respect to the main winding and the auxiliary winding where a lower speed of rotation of the rotor is suitable or where a higher frequency of alternating current is supplied from the source so as to increase the speed in that manner.

As soon as the rotor 25 has come up to speed, the the various characteristics may be observed, as explained before. The stator is then disconnected from the power source, and the rotor 25 removed to make room for the next rotor to be tested.

By the provision of this invention, it is possible to arrange the rotor in the testing apparatus without the need for any securement operation whatsoever. This, in combination with adaquate starting means and suitable testing facilities, permits high rate of effective testing with a low amount of time consumed for each individual unit tested.

While the invention has been explained by describing a particular embodiment thereof, it will be apparent that improvements and modifications may be made without departing from the scope of the invention as defined in the appended claims.

What we claim as new and desire to secure by Letters Patent of the United States is:

1. A rotor testing device comprising a stator core member having an interior slotted surface and having an approximately 180 degree span, said core member being positioned with the interior surface thereof facing in a generally upward direction, main and auxiliary windings arranged thereon and displaced in phase from each other, housing and supporting means therefor including bearing supports on each side of said core member and concentric therewith, said bearing supports being adapted to receive the shaft of rotor member to support the same concentrically and coaxially with said core member.

2. A rotor testing device comprising a stator core member having an interior slotted surface and having an approximtaely 180 degree span, said core member being positioned with the interior surface thereof facing in a generally upward direction, main and auxiliary windings arranged thereon and displaced in phase from each other, housing and supporting means therefor including bearing supports on each side of said core member and concentric therewith, said bearing supports being adapted to receive the shaft or rotor member to support the same concentrically and coaxially with said core member, said core member including at least one additional winding arranged thereon for sensing various rotor characteristics when said main and said auxiliary windings are energized to cause rotation of the rotor member.

3. A rotor testing device comprising a stator core member having an interior slotted surface and having an approximately 180 degree span, said core member being positioned with the interior surface thereof facing in a generally upward direction, main and auxiliary windings arranged thereon and adapted to be connected in parallel to a source of alternating current power, phase displacing means connected in series with said auxiliary winding, housing and supporting means for said core member including bearing supports on each side thereof and concentric therewtih, said bearing supports being adapted to receive the shaft of rotor member to support the same concentrically and coaxially with said core member, said core member including at least one additional winding arranged thereon for sensing various rotor characteristics when said main and auxiliary windings are energized to cause rotation of the rotor member.

4. A rotor testing device comprising a stator core member having an interior slotted surface and having an approximately 180 degree span, said core member being positioned with the interior surface thereof facing in a generally upward direction, a two pole main winding arranged on said stator core member, a single pole auxiliary winding physically displaced from said two pole main winding, said main and auxiliary winding being adapted to be connected in parallel across a source of alternating current power, housing and supporting means for said core member including bearing supports on each side thereof and concentric therewith, said bearing supports being adapted to receive the shaft of a rotor member to support the same concentrically and coaxially with said core member, said core member including at least one additional winding arranged thereon for sensing various rotor characteristics when said main and auxiliary windings are energized to cause rotation of the rotor member.

5. A rotor testing device comprising a stator core member having an interior slotted surface and having an approximately 180 degree span, main and auxiliary windings arranged thereon and displaced in phase from each other, housing and supporting means for said core member including a substantially semicylindrical bearing support on each side of said core member and concentric therewith, said device being positioned with said core member interior surface and said bearing supports positioned facing in a generally upward direction, said bearing supports being adapted to receive the shaft of a rotor member to support the same concentrically and coaxially with said core member, said core member including at least one additional winding arranged thereon for sensing various rotor characteristics when said main and auxiliary windings are energized to cause rotation of a rotor member.

6. A rotor testing device comprising a stator core member having an interior slotted surface having an approximately 180 degree span and having a plurality of arcuately spaced slots formed in its inner surface, a main winding arranged in some of said slots, an auxiliary winding arcuately displaced from said main winding arranged in some of said slots, said main and auxiliary winding being adapted to be connected in parallel across a source of alternating current power, phase displacing means in series with said auxiliary winding, housing and supporting means for said core including semicylindrical bearing supports on each side thereof and concentric therewith, said device being positioned with said core member interior surface and said bearing supports positioned facing in a generally upward direction, said semicylindrical bearing supports being adapted to receive the shaft of rotor member to support the same concentrically and coaxially with said core member, said core member including at least one additional winding arranged thereon for sensing various rotor characteristics when said main and auxiliary windings are energized to cause rotation of the rotor member.

References Cited in the file of this patent

UNITED STATES PATENTS

| | | |
|---|---|---|
| 1,540,038 | Spielman | June 2, 1925 |
| 1,551,347 | Trombetta | Aug. 25, 1925 |
| 1,991,042 | Werner | Feb. 12, 1935 |
| 2,398,156 | Puterbough | Apr. 9, 1946 |
| 2,640,100 | Packer | May 26, 1953 |
| 2,640,956 | Buchanan | June 2, 1953 |